(12) United States Patent
Zheng et al.

(10) Patent No.: US 12,365,077 B2
(45) Date of Patent: Jul. 22, 2025

(54) ELECTRIC DRILL AND ELECTRIC TOOL

(71) Applicant: Nanjing Chervon Industry Co., Ltd., Nanjing (CN)

(72) Inventors: Hanqing Zheng, Nanjing (CN); Chunrui Li, Nanjing (CN); Rui Zhan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 570 days.

(21) Appl. No.: 17/846,665

(22) Filed: Jun. 22, 2022

(65) Prior Publication Data
US 2023/0007837 A1  Jan. 12, 2023

(30) Foreign Application Priority Data

Jul. 6, 2021 (CN) .................. 202110760646.X

(51) Int. Cl.
| | |
|---|---|
| B25F 5/00 | (2006.01) |
| H02K 7/14 | (2006.01) |
| H02K 9/06 | (2006.01) |
| H02K 9/14 | (2006.01) |
| B24B 23/02 | (2006.01) |
| B25F 5/02 | (2006.01) |
| H02K 5/15 | (2006.01) |

(52) U.S. Cl.
CPC .............. *B25F 5/001* (2013.01); *B25F 5/008* (2013.01); *H02K 7/145* (2013.01); *H02K 9/06* (2013.01); *H02K 9/14* (2013.01); *B24B 23/028* (2013.01); *B25F 5/02* (2013.01); *H02K 5/15* (2013.01)

(58) Field of Classification Search
CPC ....... B24B 23/028; B24B 23/03; B24B 47/12; B25F 5/001; B25F 5/008; B25F 5/02; H02K 7/145; H02K 9/06; H02K 9/14; H02K 5/15; H02K 5/18; H02K 7/14
USPC .......................................... 173/29, 217, 171
See application file for complete search history.

(56) References Cited

U.S. PATENT DOCUMENTS

| | | | | |
|---|---|---|---|---|
| 3,302,047 A | * | 1/1967 | Short | H02K 9/06 310/60 R |
| 3,652,879 A | * | 3/1972 | Plunkett | H02K 7/145 408/124 |
| 3,829,722 A | * | 8/1974 | Rosenthal, Jr. | H02K 5/08 415/217.1 |
| 3,961,864 A | * | 6/1976 | Papst | F04D 25/082 415/217.1 |

(Continued)

FOREIGN PATENT DOCUMENTS

| | | |
|---|---|---|
| CN | 101096098 A | 2/2013 |
| CN | 107081447 A | 8/2017 |

(Continued)

*Primary Examiner* — Scott A Smith
(74) *Attorney, Agent, or Firm* — Greenberg Traurig, LLP

(57) ABSTRACT

An electric drill and an electric tool, including: a housing provided with an air inlet and an air outlet; a motor received in the housing, wherein the motor at least comprises a motor shaft; a drill bit, acting on a workpiece; the motor shaft is connected to the drill bit; a gearbox arranged in the housing for accommodating the transmission assembly; a fan supported by the motor shaft; wherein the gearbox is formed with a passage, and at least a part of a flow path of an airflow that enters the housing from the air inlet and flows out of the housing from the air outlet is provided on the passage.

19 Claims, 4 Drawing Sheets

(56) References Cited

U.S. PATENT DOCUMENTS

| | | | | |
|---|---|---|---|---|
| 5,315,193 | A * | 5/1994 | Kummer | H02K 9/06 310/58 |
| 5,317,838 | A * | 6/1994 | Bourner | B24B 23/03 451/357 |
| 5,580,302 | A * | 12/1996 | Howard, Jr. | B24B 55/10 451/357 |
| 5,632,578 | A * | 5/1997 | McCurry | B25F 5/008 409/137 |
| 6,543,549 | B1 * | 4/2003 | Riedl | B25F 5/02 173/171 |
| 6,703,754 | B1 * | 3/2004 | Finkenbinder | H02K 7/14 310/227 |
| 7,541,701 | B2 | 6/2009 | Lin | H02K 9/14 310/58 |
| 8,096,857 | B2 * | 1/2012 | Hofmann | B25F 5/02 451/344 |
| 8,531,065 | B2 * | 9/2013 | Knorr | H02K 9/06 310/58 |
| 10,434,635 | B2 * | 10/2019 | Blum | B25F 5/008 |
| 10,807,226 | B2 * | 10/2020 | Bernhart | B25D 17/00 |
| 11,289,977 | B2 * | 3/2022 | Lörcher | F28F 3/025 |
| 2005/0034883 | A1 * | 2/2005 | Yamada | B25F 5/008 173/217 |
| 2006/0175915 | A1 | 8/2006 | Voigt | |
| 2008/0090504 | A1 * | 4/2008 | Trautner | B24B 23/022 451/359 |
| 2010/0132968 | A1 * | 6/2010 | Hartmann | B25F 5/008 173/217 |
| 2014/0147252 | A1 * | 5/2014 | Takano | F04D 29/2216 416/54 |
| 2016/0193727 | A1 * | 7/2016 | Takeda | B25F 5/008 173/46 |
| 2016/0243693 | A1 * | 8/2016 | Chen | B25F 5/008 |
| 2019/0099874 | A1 | 4/2019 | Yang | |
| 2020/0055159 | A1 * | 2/2020 | Sakai | B24B 47/12 |

FOREIGN PATENT DOCUMENTS

| | | |
|---|---|---|
| CN | 107999827 A | 5/2018 |
| CN | 108789283 A | 11/2021 |
| EP | 3173170 B1 | 11/2018 |
| EP | 3534504 A1 | 9/2019 |

* cited by examiner

… (US 12,365,077 B2)

ELECTRIC DRILL AND ELECTRIC TOOL

RELATED APPLICATION INFORMATION

This application claims the benefit under 35 U.S.C. § 119(a) of Chinese Patent Application No. CN 202110760646.X, filed on Jul. 6, 2021, which application is incorporated herein by reference in its entirety.

BACKGROUND

In recent years, with the miniaturization of the structure of electric tools, there are more and more users favoring electric drills, and application scenarios of the electric drills are becoming more and more extensive. In some occasions, the users have higher and higher requirements for the electric drills. For example, while the users require the structure of the electric drills to be miniaturized, it also puts forward higher requirements for a rotational speed to meet performance requirements of the electric tools. As a speed of a motor of the electric drills increases, heat generated by a gearbox for housing drive components increases. In current prior arts, since the motor will generate a large amount of heat during a low-speed or a high-speed operation, it is also extremely important to effectively and comprehensively dissipate heat for the motor. Therefore, prior arts provide many solutions with particular regards to a heat dissipation problem of the motor of the electric drills, but ignore the heat dissipation problem of the gearbox when the electric tools are running at a high speed. If the heat dissipation problem of the gearbox cannot be effectively solved while increasing the speed of the motor of the electric tools, it will eventually lead to a failure of the gearbox, which will also make the electric drills unable to function normally.

SUMMARY

An electric drill, including: a housing provided with an air inlet and an air outlet; a motor received in the housing, wherein the motor at least includes a motor shaft; a fan supported by the motor shaft; a transmission assembly configured to connect the motor shaft to an output shaft; and a gearbox configured to accommodate the transmission assembly; wherein the gearbox includes a gearbox rear cover formed with a passage, and at least a part of a flow path of an airflow that enters the housing from the air inlet and flows out of the housing from the air outlet is provided on the passage.

In an example, a diverter rib configured to guide the airflow is provided within the passage.

In an example, an outer surface of the gearbox rear cover extending in a circumferential direction is provided with a first vent, the first vent is arranged at an end of the passage, a rear surface of the gearbox rear cover opposite to the fan is provided with a second vent, and the second vent is provided at the other end of the passage.

In an example, the housing is provided with a first air inlet configured to cool the motor.

In an example, the housing is provided with a second air inlet opposite to the first vent.

In an example, a first fan blade is provided on a side of the fan opposite to the motor, and a second fan blade is provided on a side of the fan opposite to the gearbox.

In an example, the housing is provided with a first air outlet, and the first air outlet is arranged along the radial direction of the first fan blade.

In an example, the housing is provided with a second air outlet, and the second air outlet is arranged along the radial direction of the second fan blade.

In an example, the gearbox rear cover is provided opposite to the fan along the extending direction of the motor shaft.

In an example, the gearbox rear cover is made of metal material.

An electric drill, including: a housing provided with an air inlet and an air outlet; a motor received in the housing, wherein the motor at least includes a motor shaft; a fan supported by the motor shaft; a transmission assembly configured to connect the motor shaft to an output shaft; and a gearbox configured to accommodate the transmission assembly; wherein the gearbox is formed with a passage, and at least a part of a flow path of an airflow that enters the housing from the air inlet and flows out of the housing from the air outlet is provided on the passage.

In an example, a diverter rib configured to guide the airflow is provided within the passage.

In an example, an outer surface of the gearbox extending in a circumferential direction is provided with a first vent, the first vent is arranged at an end of the passage, a rear surface of the gearbox opposite to the fan is provided with a second vent, and the second vent is provided at the other end of the passage.

In an example, the housing is provided with a first air inlet configured to cool the motor.

In an example, the housing is provided with a second air inlet opposite to the first vent.

In an example, a first fan blade is provided on a side of the fan opposite to the motor, and a second fan blade is provided on a side of the fan opposite to the gearbox.

In an example, the housing is provided with a first air outlet, and the first air outlet is arranged along the radial direction of the first fan blade.

In an example, the housing is provided with a second air outlet, and the second air outlet is arranged along the radial direction of the second fan blade.

In an example, wherein the gearbox includes a box body and a gearbox rear cover, and the gearbox rear cover is provided opposite to the fan along the extending direction of the motor shaft.

In an example, the passage is provided in the gearbox rear cover.

An electric tool, including: a housing provided with an air inlet and an air outlet; a motor received in the housing, wherein the motor at least includes a motor shaft; a transmission assembly configured to connect the motor shaft to an output shaft; a gearbox configured to accommodate the transmission assembly; and a fan supported by the motor shaft; wherein the gearbox is provided with a passage for an airflow to flow, and at least a part of a flow path of the airflow that enters the housing from the air inlet and flows out of the housing from the air outlet is provided on the passage.

DETAILED DESCRIPTION

The present disclosure is described below in detail in conjunction with drawings and examples.

Figure 1:
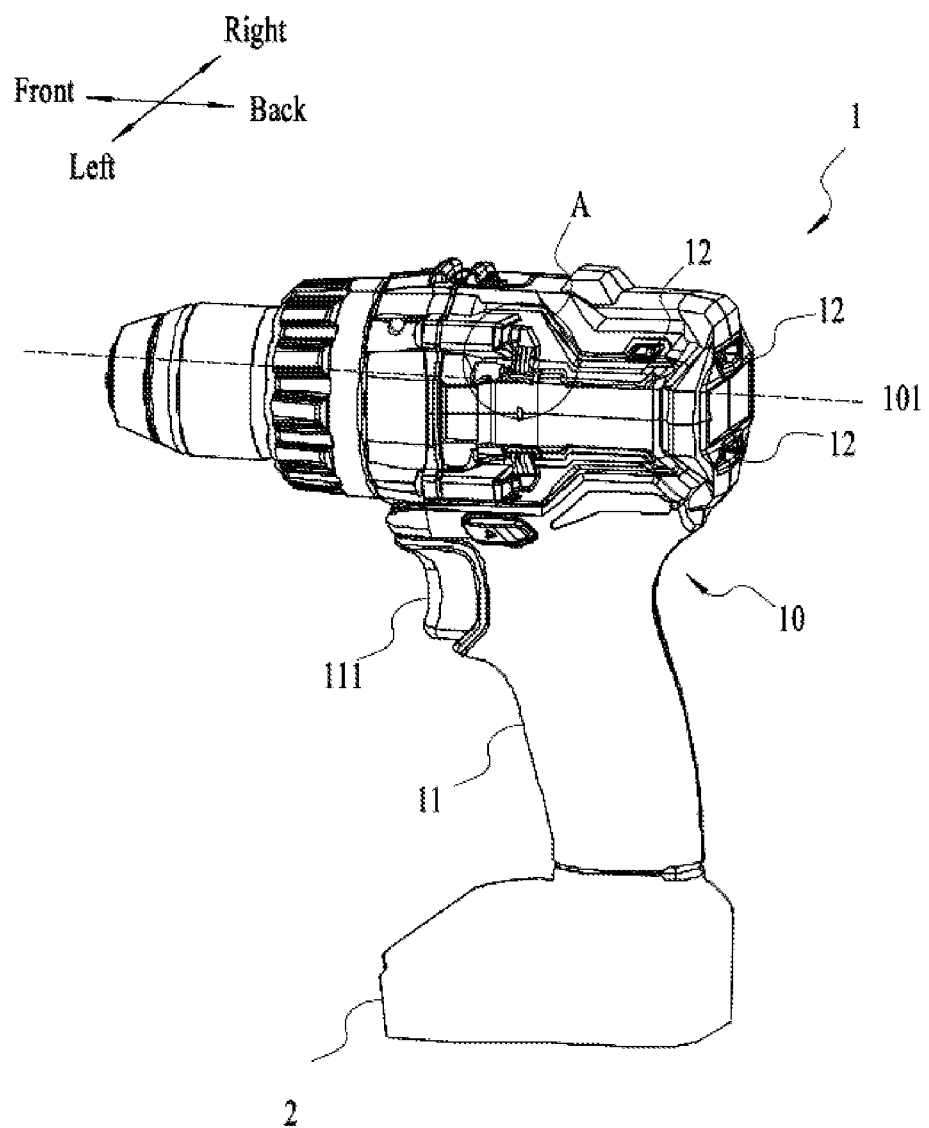
FIG. 1 is a structure view of an electric drill according to an example.

FIG. 1 shows an electric tool as a specific example of the present disclosure. The electric tool is an electric drill 1, which can at least provide a torque to assist a screw to drive into a workpiece and can provide an impact force for a hammering operation to meet the different needs of users. The following examples are some of the examples of the present disclosure, but not all of the examples of the present disclosure.

Figure 2:
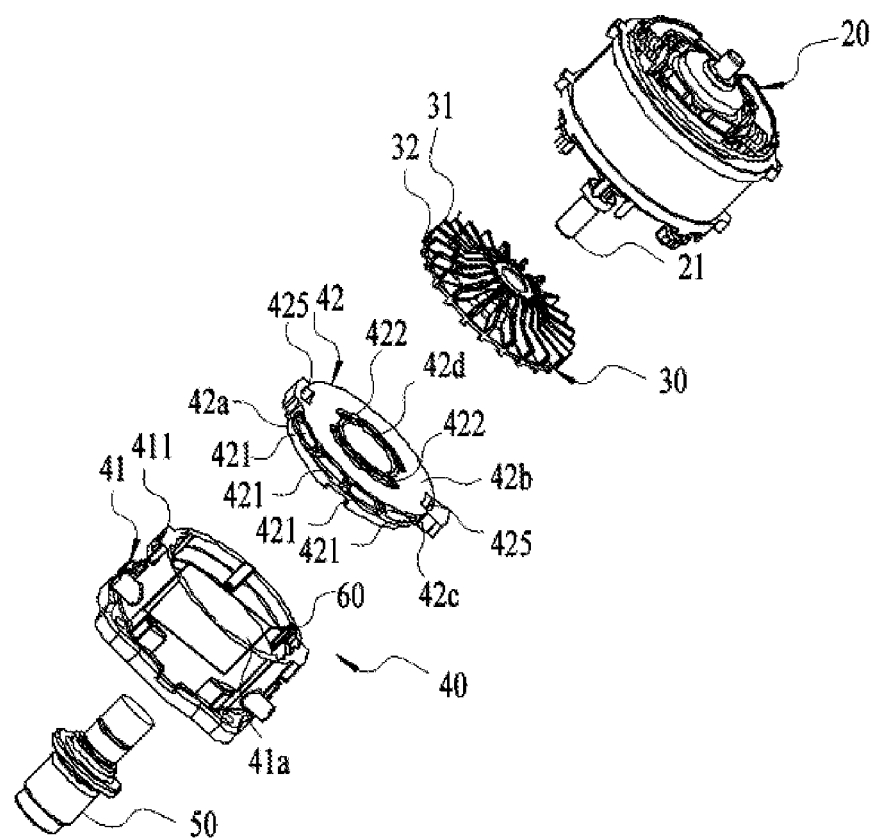
FIG. 2 is a partial exploded view of the electric drill of FIG. 1.

Referring to FIGS. 1 and 2, the electric drill 1 includes a housing 10, a motor 20, a fan 30, a gearbox 40, an output shaft 50 and a drill bit (not shown in the drawings). The housing 10 is formed with a handle 11 for the users to hold. One end of the handle 11 is connected with a power interface for connecting to a DC or an AC power supply. In some examples, a battery pack 2 is connected to the power interface, and the battery pack 2 is detachably connected to the electric drill 1. It is to be understood that the power interface can also be connected to an alternating current, such as a commercial power. The handle 11 is also provided with a main control switch 111 for controlling the start and stop of the electric drill 1. In some examples, the main control switch 111 can also realize a speed regulation function. The users control a rotation speed of the electric drill 1 by controlling a stroke of the main control switch 111 pressed. The greater the stroke is, the higher the rotation speed of the electric drill 1 is; on the contrary, the lower the rotation speed of the electric drill 1 is. The housing 10 forms an accommodating space (not shown in the figure) along the direction of a first straight line 101, and the motor 20, the fan 30 and the gearbox 40 are sequentially arranged in the above accommodating space. The motor 20 is supported by the housing 10 and drives the output shaft 50 to drive the drill bit to rotate. The motor 20 includes a motor shaft 21, and the fan 30 is supported by the motor shaft 21 to dissipate heat for the electric drill 1. The electric drill 1 includes a transmission assembly 60, the gearbox 40 forms an accommodating space 41a, and the transmission assembly 60 is arranged in the accommodating space 41a. The transmission assembly 60 is connected to the motor shaft 21 and the output shaft 50. The motor 20 drives the output shaft 50 to rotate by means of the transmission assembly 60, thereby driving the drill bit to rotate to complete the processing of the workpiece.

The users will encounter various working conditions when using the electric drill 1. When the users need the electric drill 1 to operate at a high speed, an increase of the rotational speed of the motor 20 will inevitably increase the heat generated by the gearbox 40 gradually. The electric drill 1 in this example is a hand-held electric drill. In order to improve the feeling of hands of the users, the material of the gearbox 40 is plastic or other light materials, thereby reducing the weight of the electric drill 1. The high-speed operation of the motor 20 will inevitably cause the gearbox 40 to generate high heat. If the gearbox 40 is in a high-heat environment for a long time, a life of the gearbox 40 will inevitably be affected. Next, a structure of an electric drill 1 will be introduced in detail, so that during the operation of the electric drill 1, especially during a high-speed operation of the electric drill 1, the heat of both the motor 20 and the gearbox 40 can be comprehensively and effectively dissipated, so that the electric drill 1 is structurally miniaturized and lightweight, while having good dissipation effect.

Figure 3:
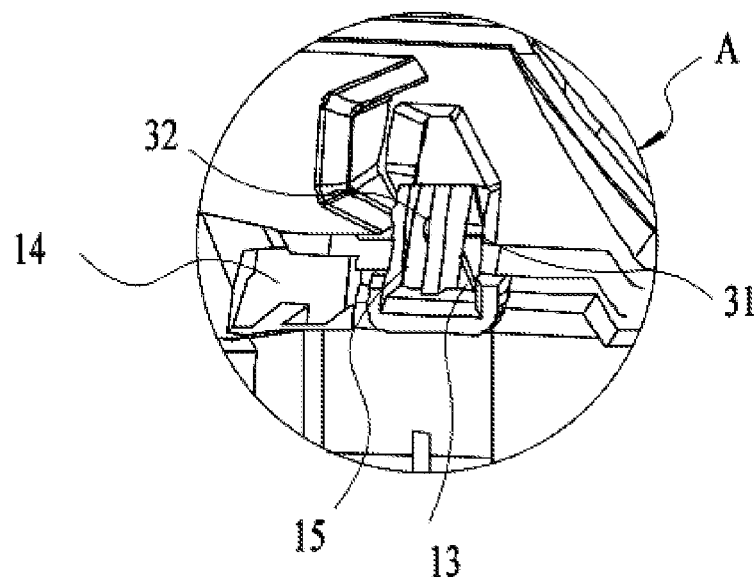
FIG. 3 is an enlarged view of FIG. 1 at location A.

Referring to FIGS. 1 and 3, the housing 10 is provided with a first air inlet 12 and a first air outlet 13. The first air inlet 12 is optionally provided on a rear side of the housing 10. The first air inlet 12 is also optionally provided on one of the left or right sides of the housing 10. It is to be understood that the first air inlet 12 should be provided on the housing 10 near the motor 20. In this disclosure, the number and specific positions of the first air inlet 12 are not limited, and the designer can design the first air inlet 12 based on actual usage. The first air outlet 13 is distributed on the housing 10 along the radial direction of the fan 30. Referring to FIG. 2, in one example, the fan 30 is a double-blade fan. The fan 30 includes a first fan blade 31 close to the motor 20 and a second fan blade 32 close to the gearbox 40. In an example, the first air outlet 13 is arranged on the housing 10 along the radial direction of the first fan blade 31. When the electric drill 1 is started, the fan 30 operates, the airflow enters the housing 10 from the first air inlet 12, flows through the motor 20 and then flows out of the housing 10 from the first air outlet 13, thereby taking away most of the heat of the motor 20. Most of the airflow in the above heat dissipation process is generated by the first fan blade 31.

Figure 4:
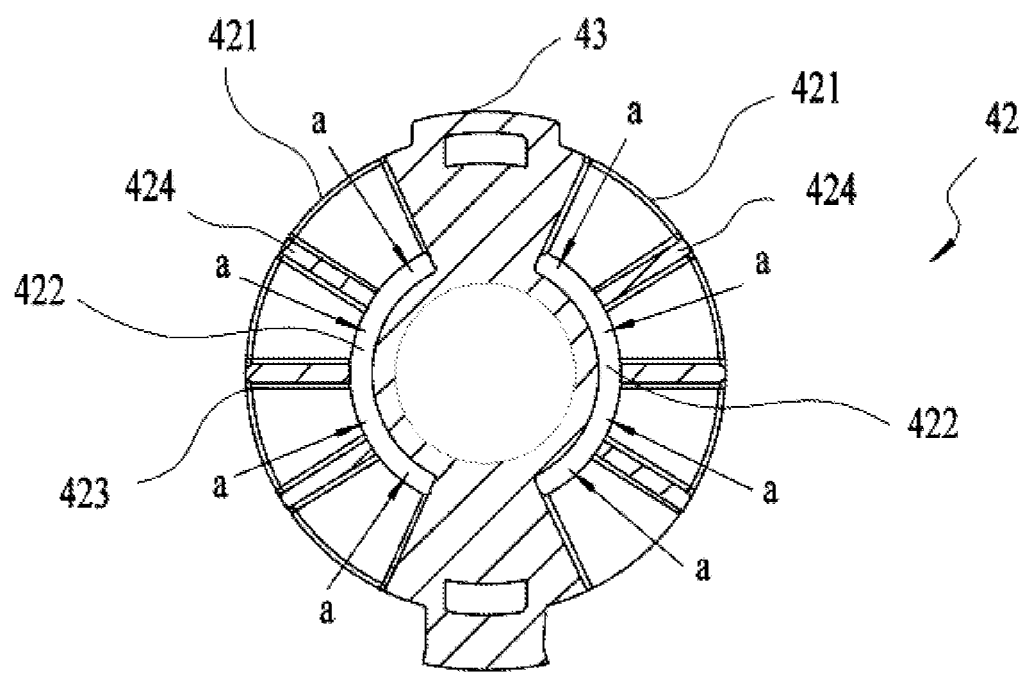
FIG. 4 is a section view of a gearbox rear cover.

Referring to FIG. 2 and FIG. 4, in this example, the gearbox 40 includes a box body 41 and a gearbox rear cover 42. The box body 41 is formed with an accommodating space 41a for accommodating the transmission assembly 60. Specifically, the box body 41 is made of a plastic material, which can reduce a weight of a complete machine of the electric drill 1. The gearbox rear cover 42 is arranged to be adjacent to the fan 30 along the direction of the first straight line 101. Specifically, the gearbox rear cover 42 is formed with a front surface 42a away from the fan 30, a rear surface 42b close to the fan 30, and an outer surface 42c. In an example, the gearbox rear cover 42 is made of metal or other materials with good thermal conductivity. In this example, the rear surface 42b of the gearbox rear cover 42 is provided opposite to the second fan blade 32 of the fan 30. The gearbox 40 includes a connecting portion 43 for a fixed connection between the box body 41 and the gearbox rear cover 42 during assembly. The box body 41 is provided with a slot 411, and the gearbox rear cover 42 is provided with a buckle 425 matching the slot 411. The fixed connection between the box body 41 and the gearbox rear cover 42 during assembly is realized by means of the slot 411 and the buckle 425.

Referring to FIG. 2 to FIG. 4, in this example, the gearbox 40 is provided with a passage 423 for the airflow to flow. It should be noted here that since the gearbox rear cover 42 is provided with a passage 423 for the airflow to flow, the gearbox rear cover 42 must have a certain thickness, but the thickness of the gearbox rear cover 42 in this disclosure is not limited, and people who are skilled in the art can independently design the thickness of the gearbox rear cover 42 according to an actual situation. It should be noted that the gearbox rear cover 42 can be hollowed with a thickness, or the gearbox rear cover 42 can be solid with a thickness. Specifically, the gearbox rear cover 42 is provided with a first vent 421 and a second vent 422. The first vent 421 and the second vent 422 constitute two ends of the passage 423. The first vent 421 is arranged along the circumferential direction of the gearbox rear cover 42, and the second vent 422 is provided on a surface of the gearbox 40 opposite to the fan 30. The housing 10 is also provided with a second air inlet 14 and a second air outlet 15. Specifically, the second air inlet 14 is arranged opposite to the first vent 421, and the second air outlet 15 is arranged along the radial direction of the second fan blade 32 of the fan 30. When the electric drill 1 is started, the fan 30 operates, the airflow enters the housing 10 from the second air inlet 14, enters the gearbox rear cover 42 from the first vent 421, flows through the passage 423, then flows out of the gearbox rear cover 42 from the second vent 422, and then flows out of the housing 10 from the second air outlet 15 after passing by the second fan blade 32. Most of the airflow in the above heat dissipation process of the gearbox 40 is generated by the second fan blade 32.

Referring to FIG. 3, both the first air outlet 13 and the second air outlet 15 are provided on the housing 10 along the radial direction of the fan 30. Specifically, the first air outlet 13 is arranged on the housing 10 along the radial direction of the first fan blade 31. The second air outlet 15 is arranged on the housing 10 along the radial direction of the second fan blade 32 of the fan 30. In this example, the first air outlet 13 and the second air outlet 15 are relatively close but isolated from each other, so that most of the airflow entering from the first air inlet 12 flows out of the first air outlet 13, and most of the airflow entering from the air outlet 14 flows out of the second air outlet 15. According to this design, a flow rate of the airflow can be maximized, and a heat dissipation effect of the electric drill 1 can be improved.

Figure 5:
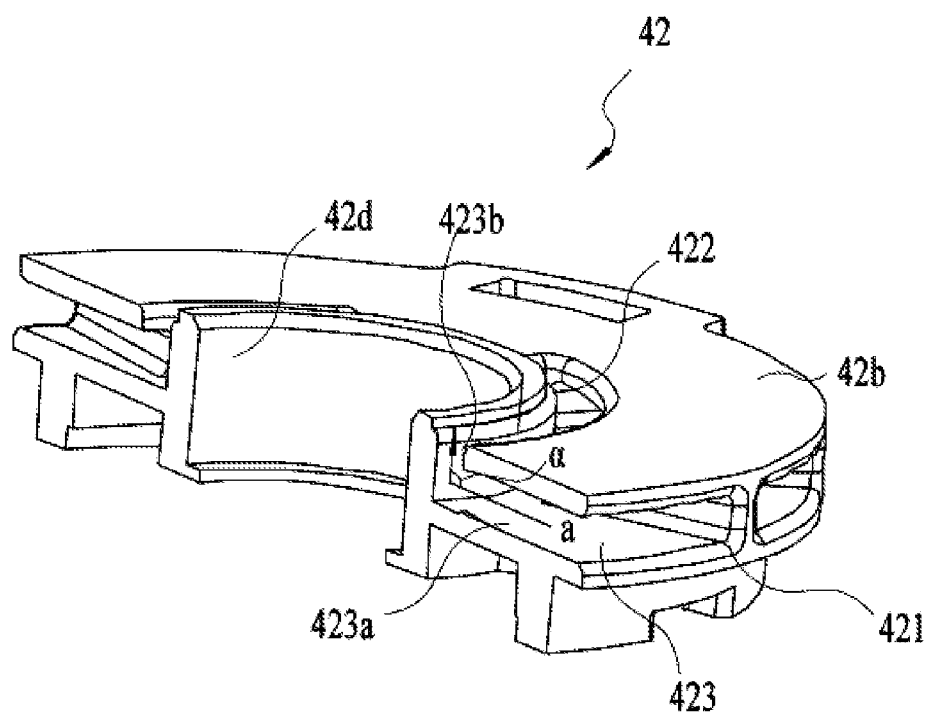
FIG. 5 is a section view of the gearbox rear cover from another point of view.

Referring to FIGS. 4 to 5, the passage 423 includes a first portion 423a and a second portion 423b. The first portion 423a is provided between a front surface 42a and a rear surface 42b of the gearbox rear cover 42. The second portion 423b is disposed between an outer surface 42c and an inner surface 42d of the gearbox rear cover 42. The first vent 421 is provided on the first portion 423a and is distributed on the outer surface 42c of the gearbox rear cover 42 in the circumferential direction of the gearbox rear cover 42. Specifically, with the connecting portion 43 as a central axis, the first vent 421 is symmetrically distributed on both sides of the connecting portion 43. The second vent 422 is disposed on the second portion 423b of the passage 423 and is symmetrically distributed on the rear surface 42b of the gearbox rear cover 42 with the connecting portion 43 as the central axis. In this example, the first vent 421 is set as an entrance of the airflow, and the second vent 422 is set as an exit of the airflow. When the airflow flows through the passage 423 after entering the passage 423 from the first vent 421, the airflow first enters the first portion 423a of the passage 423, then passes through the second portion 423b of the passage 423, and finally flows out of the passage 423 from the second vent 422.

In some examples, the gearbox rear cover 42 also includes a diverter rib 424 for an airflow guidance. Referring to FIG. 4 and FIG. 5, in order to better guide the airflow, a plurality of diverter ribs 424 are set in the passage 423. Specifically, the diverter rib 424 is provided in the first portion 423a of the passage 423. Specifically, the diverter rib 424 is provided between the front surface 42a and the rear surface 42b of the gearbox rear cover 42 and divides the first portion 423a of the passage 423 into several fan-shaped portions. When the airflow flows to the first vent 421, the airflow is divided into multiple airflows by a plurality of diverter ribs 424. As shown by arrow a in FIG. 4, when the airflow flows in the direction of arrow a, the included angle α between a flow direction in the first portion 423a and a flow direction in the second portion 423b is 90°. In order to improve a flow velocity of the airflow and thus enhance a heat dissipation efficiency of the gearbox 40, a total area of the first vent 421 in this example is set to be greater than or equal to a total area of the second vent 422. The total area of the first vent 421 and the total area of the second vent 422 are not limited, and the designer can design the first vent 421 and the second vent 422 according to a specific operating environment.

The above has shown and described the basic principles, main features and advantages of the present disclosure. Those skilled in the art should understand that the above-mentioned examples do not limit the present disclosure in any form, and all technical solutions obtained by means of equivalent replacement or equivalent transformation fall within the protection scope of the present disclosure.

What is claimed is:

1. An electric drill, comprising:
   a housing provided with an air inlet and an air outlet;
   a motor received in the housing, wherein the motor at least comprises a motor shaft;
   a fan supported by the motor shaft;
   a transmission assembly configured to connect the motor shaft to an output shaft; and
   a gearbox configured to accommodate the transmission assembly wherein the gearbox includes a box body and a gearbox rear cover, and the gearbox rear cover is provided adjacent to the fan along an extending direction of the motor shaft, the gearbox rear cover is formed with a front surface away from the fan, a rear surface close to the fan, and an outer surface,
   wherein the gearbox rear cover is formed with a passage and the passage provides at least a part of a flow path of an airflow that enters the housing from the air inlet and flows out of the housing from the air outlet,
   the gearbox rear cover is provided with a first vent and a second vent, the first vent and the second vent constituting two ends of the passage, the first vent is arranged along a circumferential direction of the gearbox rear cover, and the second vent is provided opposite to the fan, and
   the gearbox rear cover comprises a heat-conducting material.

2. The electric drill of claim 1, wherein a diverter rib configured to guide the airflow is provided within the passage.

3. The electric drill of claim 1, wherein the housing is provided with a first air inlet configured to cool the motor.

4. The electric drill of claim 1, wherein the housing is provided with a second air inlet opposite to the first vent.

5. The electric drill of claim 1, wherein a first fan blade is provided on a side of the fan opposite to the motor and a second fan blade is provided on a side of the fan opposite to the gearbox.

6. The electric drill of claim 5, wherein the housing is provided with a first air outlet and the first air outlet is arranged along a radial direction of the first fan blade.

7. The electric drill of claim 5, wherein the housing is provided with a second air outlet and the second air outlet is arranged along a radial direction of the second fan blade.

8. The electric drill of claim 1, wherein the gearbox rear cover is provided opposite to the fan along the extending direction of the motor shaft.

9. The electric drill of claim 8, wherein the gearbox rear cover is made of a metal material.

10. An electric drill, comprising:
    a housing provided with an air inlet and an air outlet;
    a motor received in the housing, wherein the motor at least comprises a motor shaft;
    a fan supported by the motor shaft;
    a transmission assembly configured to connect the motor shaft to an output shaft; and a gearbox configured to accommodate the transmission assembly;

wherein the gearbox is formed with a passage and the passage provides at least a part of a flow path of an airflow that enters the housing from the air inlet and flows out of the housing from the air outlet, and wherein an outer surface of the gearbox extending in a circumferential direction is provided with a first vent, the first vent is arranged at an end of the passage, a rear surface of the gearbox opposite to the fan is provided with a second vent, and the second vent is provided at the other end of the passage, and the gearbox comprises a heat-conducting material.

11. The electric drill of claim 10, wherein a diverter rib configured to guide the airflow is provided within the passage.

12. The electric drill of claim 10, wherein the housing is provided with a first air inlet configured to cool the motor.

13. The electric drill of claim 10, wherein the housing is provided with a second air inlet opposite to the first vent.

14. The electric drill of claim 10, wherein a first fan blade is provided on a side of the fan opposite to the motor and a second fan blade is provided on a side of the fan opposite to the gearbox.

15. The electric drill of claim 14, wherein the housing is provided with a first air outlet and the first air outlet is arranged along a radial direction of the first fan blade.

16. The electric drill of claim 14, wherein the housing is provided with a second air outlet and the second air outlet is arranged along a radial direction of the second fan blade.

17. The electric drill of claim 10, wherein the gearbox includes a box body and a gearbox rear cover and the gearbox rear cover is provided opposite to the fan along an extending direction of the motor shaft.

18. The electric drill of claim 17, wherein the passage is provided in the gearbox rear cover.

19. An electric tool, comprising:
a housing provided with an air inlet and an air outlet;
a motor received in the housing, wherein the motor at least includes a motor shaft;
a transmission assembly configured to connect the motor shaft to an output shaft;
a gearbox configured to accommodate the transmission assembly; and
a fan supported by the motor shaft;
wherein the gearbox includes a box body and a gearbox rear cover, and the gearbox rear cover comprises a heat-conductive material and is provided adjacent to the fan along an extending direction of the motor shaft, the gearbox rear cover is formed with a front surface away from the fan, a rear surface close to the fan, and an outer surface, and
wherein the gearbox is provided with a passage for an airflow to flow and the passage provides at least a part of a flow path of the airflow that enters the housing from the air inlet and flows out of the housing from the air outlet.

* * * * *